J. LEPP.
ADJUSTABLE HEADLIGHT.
APPLICATION FILED JUNE 17, 1915.
1,178,244.
Patented Apr. 4, 1916
2 SHEETS—SHEET 1.
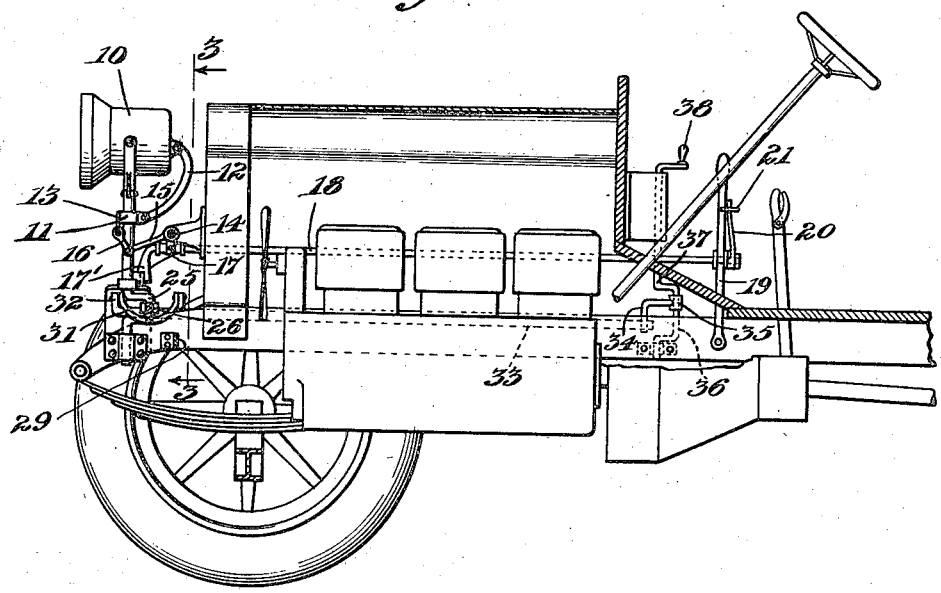
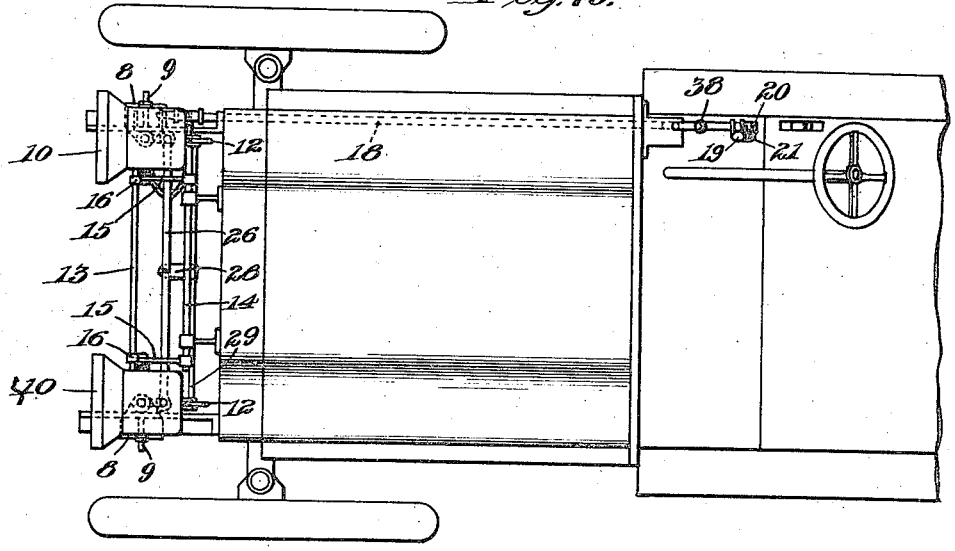
Witnesses:
H. J. Bull
B. J. Richards
Inventor,
Joseph Lepp,
by Johnson & Irons
his Attorneys.

J. LEPP.
ADJUSTABLE HEADLIGHT.
APPLICATION FILED JUNE 17, 1915.

1,178,244.

Patented Apr. 4, 1916.
2 SHEETS—SHEET 2.

Witnesses:
H. S. Bull
B. G. Richards

Inventor,
Joseph Lepp,
by Joshua R. H. Potts
his Attorney.

UNITED STATES PATENT OFFICE.

JOSEPH LEPP, OF GARY, INDIANA.

ADJUSTABLE HEADLIGHT.

1,178,244.  Specification of Letters Patent.  Patented Apr. 4, 1916.

Application filed June 17, 1915. Serial No. 34,661.

*To all whom it may concern:*

Be it known that I, JOSEPH LEPP, a citizen of the United States, and a resident of the city of Gary, county of Lake, and State of Indiana, have invented certain new and useful Improvements in Adjustable Headlights, of which the following is a specification.

My invention relates to improvements in adjustable head lights for automobiles or other vehicles, and has for its object the provision of an improved construction of this character whereby the head lights may be readily adjusted to different positions to suit different conditions.

The invention consists in the combinations and arrangements of parts hereinafter described and claimed.

Figure 3:
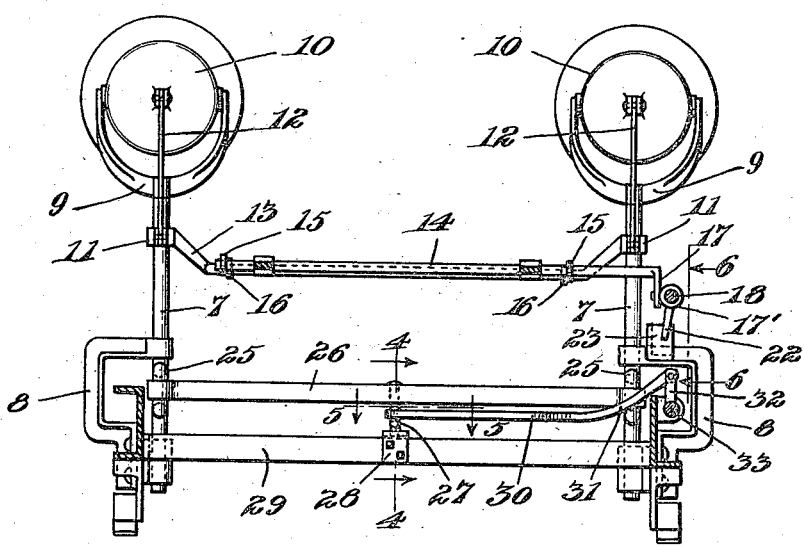
Figure 4:
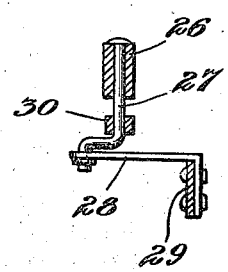
Figure 5:
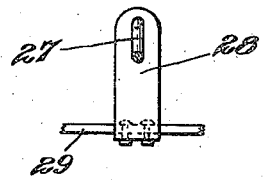
Figure 6:
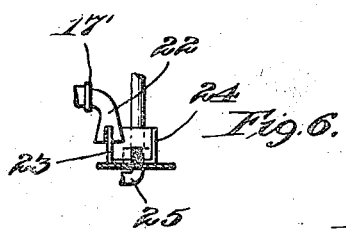

The invention will be best understood by reference to the accompanying drawings forming a part of this specification, and in which, Figure 1 is a longitudinal section taken through the forward end of an automobile equipped with a construction embodying my invention, Fig. 2, a top plan view of the same, Fig. 3, a vertical section taken on substantially line 3—3 of Fig. 1, Fig. 4, an enlarged section taken on line 4—4 of Fig. 3, Fig. 5, an enlarged section taken on line 5—5 of Fig. 3, and Fig. 6, a detail section taken on line 6—6 of Fig. 3.

The preferred form of construction, as illustrated in the drawings, comprises a pair of vertical shafts 7 mounted in suitable brackets 8 at the forward end of the automobile. Shafts 7 carry forks 9 at their upper ends and head lights 10 are pivotally mounted in said forks to tilt vertically. Collars 11 are slidably mounted on shaft 7 and are connected with the corresponding lamps 10 by means of curved links 12, as shown. A connecting bar 13 connects collars 11 and an oscillating shaft 14 is arranged to the rear of connecting bar 13 on suitable brackets, as indicated. Shaft 14 carries two forwardly and downwardly projecting arms 15 connected by means of links 16 with connecting bar 13 and by means of which oscillations of shaft 14 may be utilized to elevate or depress collars 13 and consequently to tilt lamps 10, as will be readily understood. At one end shaft 14 is provided with a depending operating crank arm 17 having pivotal connection with a sleeve 17' swiveled on a shaft 18 arranged longitudinally at one side of the automobile. The shaft 18 is longitudinally slidable and is carried at its inner end on an operating lever 19, as shown. Shaft 18 is provided at its inner end with an operating arm 20 and a link 21 is arranged on lever 19 to engage said arm 20 and lock said shaft 18 against rotation. At its forward end shaft 18 is provided with a depending arm 22 slotted to engage either of two flanges 23 or 24 to lock shaft 18 in adjusted longitudinal positions, as will be readily understood. By this arrangement, it will be observed that by manipulating operating arm 30, the shaft 18 may be released for longitudinal adjustment by means of operating lever 19 and that such longitudinal adjustment will effect vertical tilting of lamps 10. When the lamps are tilted the shaft 18 may be locked in either of two positions by engaging arm 22 with either of the flanges 23 or 24.

Each of the shafts 7 is provided near its bottom with a crank 25, said cranks being connected by means of a connecting bar 26 pivoted thereto. Connecting bar 26 is mounted centrally on a crank arm 27 pivoted in a bracket 28 secured to a cross bar 29 arranged at the front of the automobile. Crank 27 is connected by means of a link 30 having a bifurcated outer end 31 with crank arms 32 on a longitudinally slidable shaft 33 mounted on the automobile. Shaft 33 is provided at its inner end with an annular crank arm 34 having a sleeve 35 slidable on a crank 36 formed in a vertical operating shaft 37 provided with an operating handle 38, as indicated. By this arrangement, it will be observed that by oscillating shaft 37 through the medium of crank handle 38 the vertical shafts 7 and consequently lamps 10 may be oscillated in unison with each other from side to side so as to facilitate the turning of curves by the automobile.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with a vehicle, of a pair of vertical shafts arranged at the front thereof; lamps pivotally mounted on the tops of said shafts to tilt vertically; means for rotating said shafts; collars slidable on said shafts; links connecting said collars and said lamps to tilt the latter; and means for operating said collars, substantially as described.

2. The combination with a vehicle, of a pair of vertical shafts arranged at the front thereof; lamps pivotally mounted on the tops of said shafts to tilt vertically; cranks formed at the lower ends of said shafts; a connecting bar connecting said cranks; means for operating said bar to oscillate said shafts; collars slidable on said shafts; links connecting said collars and said lamps to tilt the latter; and means for operating said collars, substantially as described.

3. The combination with a vehicle, of a pair of vertical shafts arranged at the front thereof; lamps mounted on the tops of said shafts; cranks formed at the lower ends of said shafts; a connecting bar connecting said cranks; a crank connected centrally with said bar; a longitudinally slidable shaft; a crank at the forward end of said longitudinally slidable shaft; a link connecting said last mentioned crank with said connecting bar crank; and means for rotating and sliding said longitudinally slidable shaft, substantially as described 4. The combination with a vehicle, of a pair of vertical shafts arranged at the front thereof; lamps mounted on the tops of said shafts; cranks formed at the lower ends of said shafts; a connecting bar connecting said cranks; a crank connected centrally with said bar; a longitudinally slidable shaft; a crank at the forward end of said longitudinally slidable shaft; a link connecting said last mentioned crank with said connecting bar crank; a crank arm at the inner end of said longitudinally slidable shaft; and a vertical shaft provided with a crank slidably connected with said last mentioned crank arm, substantially as described.

5. The combination with a vehicle, of a pair of vertical shafts arranged at the front thereof; lamps mounted on the tops of said shafts; cranks formed at the lower ends of said shafts; a connecting bar connecting said cranks; a crank connected centrally with said bar; a longitudinally slidable shaft; a crank at the forward end of said longitudinally slidable shaft; a link connecting said last mentioned crank with said connecting bar crank; and means for rotating and sliding said longitudinally slidable shaft, substantially as described.

6. The combination with a vehicle, of a pair of vertical shafts arranged at the front thereof; lamps pivotally mounted on the tops of said shafts to tilt vertically; collars slidable on said shafts; a connecting bar connecting said collars; links connecting said collars with said lamps to tilt the same; an oscillating shaft operatively connected with said connecting bar to elevate the same; a crank at one end of said oscillating shaft; a longitudinally slidable shaft carrying a swiveled sleeve pivotally connected with said last mentioned crank; an operating lever carrying the inner end of said last mentioned longitudinally slidable shaft; an operating arm on the inner end of said last mentioned longitudinally slidable shaft; a link on said lever adapted to engage said operating arm; and means for locking said last mentioned longitudinally slidable shaft against rotation, substantially as described.

In testimony whereof I have signed my name to this specification in the presence of two subscribing witnesses.

JOSEPH LEPP.

Witnesses:
 JOSHUA R. H. POTTS,
 ARTHUR A. OLSON.